(12) United States Patent
Kuppagadde Sheshadri

(10) Patent No.: US 9,958,842 B2
(45) Date of Patent: May 1, 2018

(54) SYSTEM AND A METHOD FOR CONFIGURING AN INTELLIGENT ELECTRONIC DEVICE

(75) Inventor: Nagaraja Kuppagadde Sheshadri Rao, Bangalore (IN)

(73) Assignee: Siemens Aktiengesellschaft, Munich (DE)

( * ) Notice: Subject to any disclaimer, the term of this patent is extended or adjusted under 35 U.S.C. 154(b) by 301 days.

(21) Appl. No.: 14/419,830

(22) PCT Filed: Aug. 7, 2012

(86) PCT No.: PCT/EP2012/065416
§ 371 (c)(1),
(2), (4) Date: Feb. 5, 2015

(87) PCT Pub. No.: WO2014/023335
PCT Pub. Date: Feb. 13, 2014

(65) Prior Publication Data
US 2015/0205274 A1    Jul. 23, 2015

(51) Int. Cl.
*G05B 19/042* (2006.01)
*G05B 15/02* (2006.01)

(52) U.S. Cl.
CPC ........... *G05B 15/02* (2013.01); *G05B 19/042* (2013.01); *Y02B 70/3241* (2013.01); *Y04S 20/227* (2013.01)

(58) Field of Classification Search
CPC .............................. G05B 15/02; G05B 19/042
See application file for complete search history.

(56) References Cited

U.S. PATENT DOCUMENTS

| 8,365,004 B2 | 1/2013 | Kishan |
| 2004/0193294 A1 | 9/2004 | Shioya et al. |
| 2004/0193295 A1 | 9/2004 | Kaneko |
| 2006/0116794 A1* | 6/2006 | Stoupis ................. H02J 13/001 700/286 |

(Continued)

FOREIGN PATENT DOCUMENTS

| CN | 101490647 A | 7/2009 |
| CN | 101802826 A | 8/2010 |

(Continued)

OTHER PUBLICATIONS

Sintes T: "XML and Software Configuration", Dr. Dobb'S Journal, M&T Publ., Redwood City, CA, US, vol. 25, No. 7, Jul. 1, 2000 (Jul. 1, 2000), pp. 56, 58-62, XP000997367, ISSN: 1044-789X.

*Primary Examiner* — Li B Zhen
*Assistant Examiner* — Amir Soltanzadeh
(74) *Attorney, Agent, or Firm* — Laurence Greenberg; Werner Stemer; Ralph Locher

(57) ABSTRACT

A system and a method for configuring an intelligent electronic device are described. A baseline configuration of the IED and a delta configuration are processed by a configurator to thereby obtain a target configuration for the IED. The delta configuration is responsive to a target operation of the IED, and the target operation is dependent on the target configuration. The baseline configuration is defined by default parametric values of the IED and the delta configuration is defined by delta parametric values. The delta parametric values are differences between the default parametric values of the IED and respective target parametric values of the target operation.

12 Claims, 2 Drawing Sheets

(56) References Cited

U.S. PATENT DOCUMENTS

| | | | |
|---|---|---|---|
| 2007/0078540 A1 | 4/2007 | Bump et al. | |
| 2008/0154523 A1* | 6/2008 | Gilbert | G01D 4/004 702/62 |
| 2010/0205418 A1* | 8/2010 | Kishan | G06F 17/50 713/1 |
| 2010/0223033 A1 | 9/2010 | Kueng | |
| 2010/0256832 A1* | 10/2010 | Kirrmann | H02H 7/261 700/293 |
| 2012/0191959 A1 | 7/2012 | Kumar et al. | |

FOREIGN PATENT DOCUMENTS

| | | | |
|---|---|---|---|
| CN | 102254074 A | 11/2011 | |
| DE | 10346478 A1 | 5/2005 | |
| DE | 102007035159 A1 | 1/2009 | |
| DE | 102008008500 B3 | 9/2009 | |
| WO | WO 2011147856 A1 * | 12/2011 | H04L 67/34 |

* cited by examiner

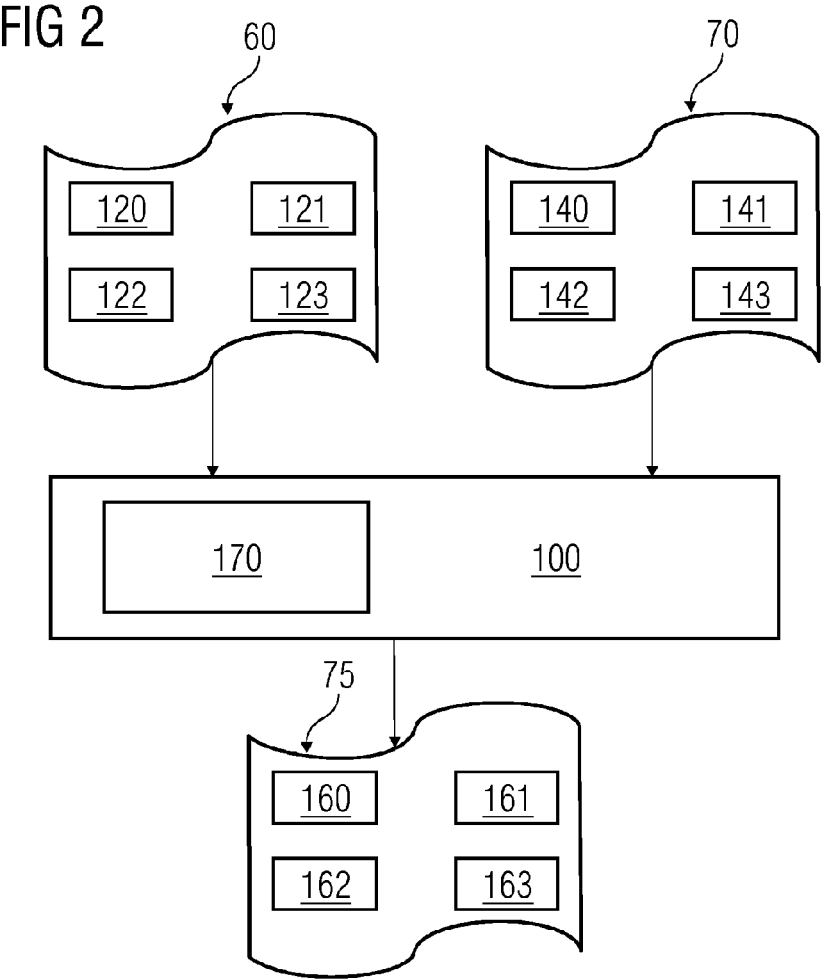
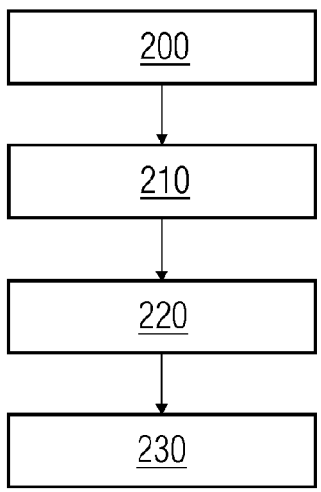

SYSTEM AND A METHOD FOR CONFIGURING AN INTELLIGENT ELECTRONIC DEVICE

BACKGROUND OF THE INVENTION

Field of the Invention

The present invention relates to the field of intelligent electronic devices, and more particularly to a system and a method for configuring an intelligent electronic device based on a target operation of the intelligent electronic device.

An intelligent electronic device (IED) is a multipurpose and a versatile microprocessor-based configurable controller that is primarily used in the domain of energy automation. The IED can be used to measure, monitor, and control electrical energy. The IED is also used to protect the devices associated with the IED, which are used to perform one or more of the aforementioned operations, and the devices may be circuit breakers, relays, sensors, busbars, et cetera.

The IED comprises a specific assemblage of components that are specifically arranged to perform a specific target operation, such as line protection, busbar protection, et cetera. Also, each component is parameterized depending on the target operation, which purports to a configuration of the IED. However, there is a large number and/or different types of components (commercial off-the-self) that normally constitute the IED.

US2010223033 relates to a configuration tool and a system for an intelligent electronic device. The patent application recites a means for visualising configurational changes using a plurality of tools during configurational changes implemented on the IED. However, the effort, the time and the complexity involved in configuring the IED is not reduced.

Currently, a major part of the task of configuring the IED is done manually with the aid of a plurality of configuration tools, wherein a user parameterizes most of the components of the IED individually. Therefore, the task of configuring the IED is both arduous and time consuming.

BRIEF SUMMARY OF THE INVENTION

The present invention proposes a simpler and a faster solution for configuring the IED.

The above objective is achieved by a system for configuring an IED as claimed and a method as claimed for configuring the IED.

The underlying idea of the present invention is to increase the speed and reduce the effort required to configure an IED. For configuring the IED depending on a target operation, the system disclosed herein comprises a configurator. The configurator receives a baseline configuration and a delta configuration and processes the same thereby obtaining a target configuration for the IED. The delta configuration is responsive to the target configuration, whereas the target configuration in turn depends on the target operation. The baseline configuration is defined by default parametric values ($VAL_{def}$) of the IED, and the baseline configuration is normally available for any IED before it is configured for a particular target operation. The delta configuration is defined by delta parametric values ($VAL_{del}$), which are differences between the default parametric values ($VAL_{def}$) of the IED and respective target parametric values ($VAL_{tar}$) of the target operation. Thus, the time and effort required to build the target configuration from the scratch is reduced by ingeniously using the baseline configuration and a delta configuration corresponding to the target operation.

In accordance with an embodiment of the present invention, the default parametric values $VAL_{def}$ of the baseline configuration and the delta parametric values ($VAL_{del}$) of the delta configuration are processed to obtain the target parametric values $VAL_{tar}$ of the target configuration. Thus, the target parametric values $VAL_{tar}$ are obtained in a reliable manner.

In accordance with another embodiment of the present invention, both the baseline configuration and the delta configuration comprise one or more function blocks. The function blocks of the baseline configuration comprise the $VAL_{def}$ and the function blocks of the delta configuration comprise the $VAL_{def}$.

In accordance with yet another embodiment of the present invention, the function blocks of both the baseline configuration and the delta configuration are modelled as objects.

By representing the configurations (baseline and delta) as function blocks and by modelling the respective function blocks as objects, it enables the use of high-level object-oriented programming tools for processing the configurations.

In accordance with yet another embodiment of the present invention, the baseline configuration and the delta configuration are implemented in Extensible Markup Language (XML) format.

In accordance with yet another embodiment of the present invention, the configurator comprises an XML engine. The XML engine processes XML files $XF_{bc}$ and $XF_{dc}$, which represent the baseline configuration and the delta configuration respectively. Therewith, an XML file $XF_{tc}$ is obtained, which represents the target configuration.

The XML representation of the configurations (baseline and delta) further simplifies the processing of the configurations. Furthermore, it enables remote access (via Ethernet, Internet) processing the same. Additionally, it enables the use of standard protocols used in the domain of IEDs such as IEC 61850, thereby enabling the configuration of IEDs irrespective of the manufacturers of IED.

In accordance with yet another embodiment of the present invention, the system comprises a configuration storage device that is operably coupled to the configurator. The configuration storage device is beneficial in storing the baseline configuration and/or the delta configuration. Herewith, it enables faster access of the baseline configuration and/or the delta configuration and also aids in storing the target configuration when required.

In accordance with yet another embodiment of the present invention, the configurator is communicatively coupled to the IED. This is advantageous for deployment of the target configuration on the IED for configuring the IED depending on the target operation.

In accordance with yet another embodiment of the present invention, the baseline configuration is accessed from the IED by the configurator. In accordance with yet another embodiment of the present invention, the baseline configuration on the IED is replaced with the target configuration. Thus, it enables upgrading an existing configuration (baseline configuration) on the IED with a desired configuration (target configuration) directly, which reduces the time required for the deployment of the target configuration on the IED.

In accordance with yet another embodiment of the present invention, the system comprises a means for notification for notifying the replacement of the baseline configuration with the target configuration. Therewith, a user can be informed when the IED is configured with the target configuration.

In accordance with yet another embodiment of the present invention, the system further comprises a Graphical User Interface (GUI). The GUI is communicatively coupled to the configurator. Herewith, it a means for visualisation is provided, which is of assistance to a user for visualising a configuration, a notification, providing data inputs, and for interacting with the system.

In the method disclosed herein for configuring the IED, the baseline configuration and the delta configuration are processed for obtaining the target configuration. The target configuration obtained thereof is deployed on the IED for configuring the IED for performing the target operation.

In accordance with an embodiment of the method disclosed in the present invention, the baseline configuration and the delta configuration are received for processing the same.

In accordance with another embodiment of the method disclosed in the present invention, the replacement of the baseline configuration with the target configuration is notified. Thus, a user can be informed when the IED is configured with the target configuration.

The aforementioned and other embodiments of the invention related to a system and a method for configuring an IED will now be addressed with reference to the accompanying drawings of the present invention. The illustrated embodiments are intended to illustrate, but not to limit the invention. The accompanying drawings contain the following figures, in which like numbers refer to like parts, throughout the description and drawings.

BRIEF DESCRIPTION OF THE SEVERAL VIEWS OF THE DRAWING

The figures illustrate in a schematic manner further examples of the embodiments of the invention, in which:

FIG. 2 depicts a baseline configuration and a delta configuration being processed by the configurator referred to in FIG. 1 for obtaining a target configuration for the IED, and FIG. 3 depicts a flowchart of a method for configuring the IED referred to in FIG. 1.

DESCRIPTION OF THE INVENTION

Figure 1:
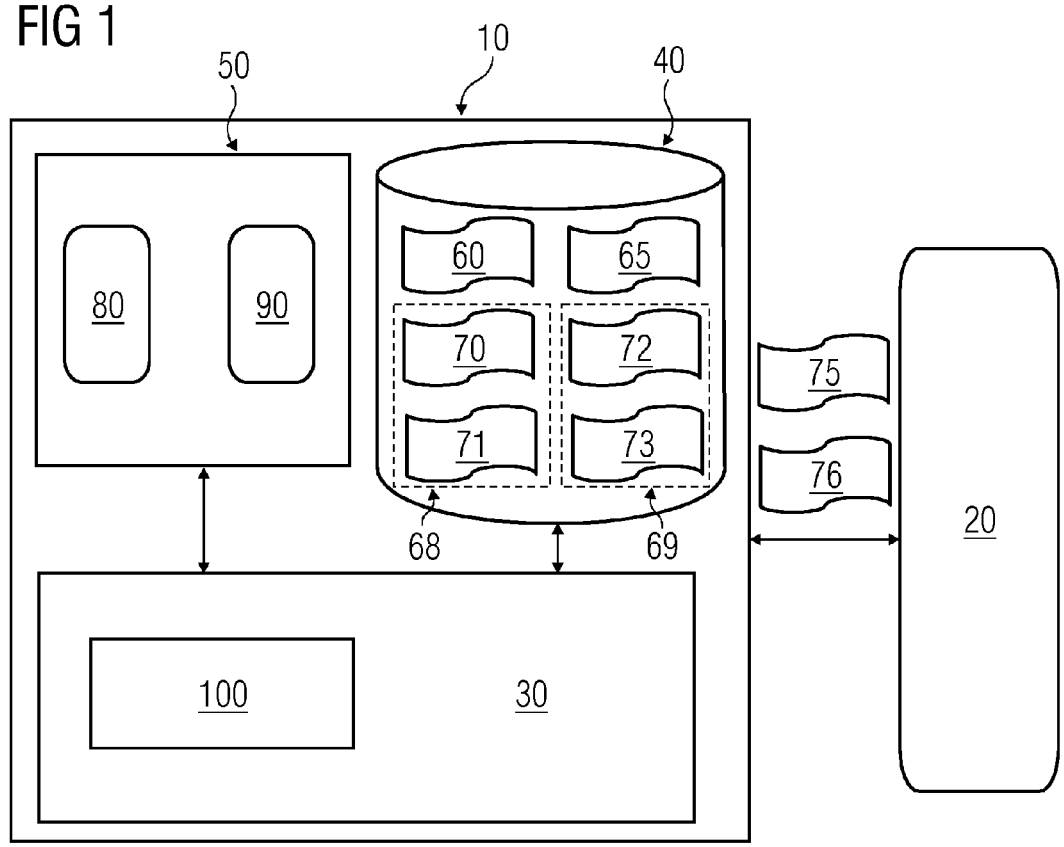
FIG. 1 depicts a system for configuring an IED, wherein the system comprises a configurator, a configuration storage device, and a graphical user interface unit.

Prior to the elucidation of the functioning of the present invention, definitions of certain terminologies used herein are given below.

"Communicatively coupled" refers to a wired/wireless coupling between two devices whereby a unilateral/bilateral transfer of data signals and/or control signals between the two devices is enabled.

"Operably coupled" refers to a coupling between two devices whereby a certain physical/computational operation involving the devices is performed, which may involve exchange of data between the two devices for performing the operation.

"Operation type" refers to a broad class of operation for which the IED is used, such as measurement, monitoring, controlling, protection, of the electrical devices et cetera.

"Target operation" refers to the specific operation for which the IED is configured and/or designed and/or finally deployed. The specific operation may be line protection, relay protection, busbar protection, distance protection, transformer protection, substation control, distribution control, et cetera.

"Configuration" comprises parametric values of different elements and parts of an IED.

"Baseline configuration" comprises default parametric values of the different elements and parts of the IED of a certain operation type.

"Target configuration" comprises final parametric values of the different elements and parts of the IED designed for a certain target operation.

"Delta configuration" is specific to the target operation of the IED, and comprises respective differences between the default parametric values and the final parametric values of the different elements and parts of the IED.

"Configurator" refers to a tool for accessing a configuration, processing a configuration, generating a configuration, and for deploying a configuration on the IED thereby configuring the IED.

"Configuration Storage Device" is a device for storing one or more configurations of the IED, such as a memory device, and is communicatively coupled to a processor. The memory device may be remotely located too, and may comprise a volatile memory and/or a non-volatile memory and the same may be located remotely too.

The invention will now be elucidated with reference to the accompanying drawings and the aforementioned definitions.

FIG. 1 depicts a system 10 for configuring an IED 20 in accordance with one or more embodiments of the present invention disclosed herein.

Herein the system 10 enables configuration of the IED 20 in accordance with a target operation of the IED 10. The system 10 primarily comprises a configurator 30, a configuration storage device 40, and a graphical user interface unit (GUI) 50. The configurator 30 is communicatively coupled to the storage device 40. Furthermore, the configurator 30 is operably coupled to the GUI unit 50.

The storage device 40 is a database wherein one or more baseline configurations 60,65 of the IED 20 are stored. The baseline configurations 60,65 depend on respective one or more operation types of the IED 20, such as 'control', 'protection', 'monitoring', et cetera. In addition to the baseline configurations 60,65, corresponding pluralities 68,69 of delta configurations 70-73 are also stored in the database 40, wherein each plurality 68,69 of the delta configurations 70-73 is specific to both the respective baseline configuration 60,65 and the target operation of the IED 20, such as 'line protection', 'busbar protection', 'substation control', 'distribution control', et cetera.

To elucidate the manner in which the database 40 is organized, two exemplary operation types of the IED 20 are considered, viz. 'control' and 'protection'. Therefore, two exemplary baseline configurations 60,65 are respectively illustrated for the same, viz. 'protection' represented by the baseline configuration 60 and 'control' represented by the baseline configuration 65. Furthermore, two exemplary delta configurations 70,71, viz. 'line protection delta configuration 70' and 'busbar protection delta configuration 71' are illustrated with reference to the exemplary baseline configuration 60 related to 'protection'. Similarly, two exemplary delta configurations 72,73, viz. 'substation control delta configuration 72' and 'distribution control delta configuration 73' are illustrated with reference to the exemplary baseline configuration 65 related to 'control'.

The aforementioned baseline configurations 60,65 and the delta configurations 70-73 are advantageous in obtaining a target configuration 75, wherein the target configuration 75 depends on a target operation of the IED 20. In order to achieve this, an appropriate baseline configuration 60 and an appropriate delta configuration 70 are received by the configurator 30 from the database 40, and the baseline configuration 60 and the delta configuration 70 are processed to obtain the target configuration 75.

For example, the target configuration 75 for 'line protection' is obtained by processing the baseline configuration 60 related to 'protection' and the delta configuration 70 related to 'line protection delta configuration', i.e. the delta configuration 70 herein is responsive to the target operation of the IED 20. Similarly, a target configuration 76 for 'substation control' is obtained by processing the baseline configuration 65 related to 'control' and the delta configuration 70 related to 'substation control delta configuration', i.e. the delta configuration 72 herein is responsive to the target operation of the IED 20. The target configuration 75,76 obtained therewith is subsequently deployed on the IED 20 for configuring the IED 20 based on the aforementioned target operation.

The GUI unit 50 comprises a visual display unit (VDU) 80 and a data input device 90 (hereinafter "the input device 90"). The VDU 80 facilitates the visualisation and/or modification of baseline configurations 60,65, delta configurations 70-73 and/or target configurations 75,76. The input device 90 enables providing data inputs for accessing one or more configurations (baseline 60,65, delta 70-73, and target configurations 75,76), and for deploying the respective target configuration 75,76 for configuring the IED 20.

The configurator 30 comprises a processor 100 for processing a baseline configuration 65 and a respective delta configuration 70 for obtaining a respective target configuration 75 for configuring the IED 20. In order to achieve this, the processor 100 accesses the baseline configuration 60 and the respective delta configuration 70 from the database 40, processes the accessed baseline configuration 60 and the respective delta configuration 70 thereby obtaining the respective target configuration 75, and providing the target configuration 75 for deployment on the IED 20 for configuring the IED 20. The exact manner in which this is performed will be elucidated in detail with reference to FIG. 2.

FIG. 2 depicts the baseline configuration 60 and the delta configuration 70 being processed by the processor 100 for obtaining the target configuration 75 according to one or more embodiments of the present invention disclosed herein.

The baseline configuration 60 is herein defined by default parametric values $VAL_{def}$ of the IED 20 based on the operation type of the IED 20. For example, the baseline configuration 60 related to 'protection' comprises the default parametric values $VAL_{def}$ of an IED 20 related to 'protection'. The target configuration 75 is herein defined by target parametric values $VAL_{tar}$ for configuring the IED 20 based on the target operation of the IED 20. The delta configuration 70 comprises delta parametric values $VAL_{del}$, which are defined as the respective differences between the default parametric values $VAL_{del}$ of the baseline configuration 60 and the target parametric values $VAL_{tar}$ of the target configuration 75.

Prior to further explanation of FIG. 2, it is to be understood that in reality the target parametric values $VAL_{tar}$ for an IED 20 for performing the target operation, such as 'line protection', are normally deduced from target IED requirements and specifications for performing the target operation. However, the target configuration 75 for configuring the IED 20, such as a configuration loader file or an object file, is not directly available for directly loading the same onto the IED 20 for configuring the IED 20 for performing the target operation 'line protection'. The target configuration 75 is to be created in order to configure the IED 20. Furthermore, the cardinal number of the parametric values $VAL_{tar}$ (i.e. the number of parametric values $VAL_{tar}$) may run into thousands, and to manually configure the IED 20 in order to perform the target operation is an arduous task owing to the growing complexities of IED 20. However, default parametric values $VAL_{def}$ of a baseline configuration 60 for an IED 20 belonging to a certain operation type are normally known, such as default parametric values $VAL_{def}$ of the baseline configuration 60 for an operation type such as 'protection'. By determining the difference between the default parametric values $VAL_{def}$ and the target parametric values $VAL_{tar}$, the delta parametric values $VAL_{del}$ are obtained, for example the delta parametric values $VAL_{del}$ for 'line protection delta configuration'. The default parametric values $VAL_{def}$ and the delta parametric values $VAL_{del}$ are then processed to obtain the target configuration comprising target parametric values $VAL_{tar}$, such as a target configuration loader file or an object file, which is then deployed on the IED 20. The detailed manner in which the aforementioned is achieved will now be elucidated in the following sections.

According to an exemplary embodiment of the present invention, both the baseline configuration 60 and the delta configuration 70 comprise one or more function blocks 120-123,140-143. The function blocks 120-123 of the baseline configuration 60 comprise the default parametric values $VAL_{def}$ of the baseline configuration 60. Furthermore, the baseline configuration 60 comprises information related to the interdependencies and interconnections between the function blocks 120-123 of the baseline configuration 60. Similarly, the function blocks 140-143 of the delta configuration 70 comprise the aforementioned delta parametric values $VAL_{del}$. Furthermore, the delta configuration 70 comprises information related to data interdependencies and interconnections between the function blocks 140-143 of the delta configuration 70. The target configuration 75, which is obtained by processing the baseline configuration 60 and the delta configuration 70, also comprises one or more function blocks 160-163, which define target parametric values $VAL_{tar}$ for the IED 20 for performing the target operation as defined by the target configuration 75.

The function blocks 120-123 of the baseline configuration 60, and the function blocks 140-143 of the delta configuration 70 are modelled as objects in accordance with another embodiment of the present invention. Herewith, it facilitates object-oriented representation of the baseline configuration 60 and the delta configuration 70. This enables the use of object-oriented programming tools for processing the baseline configuration 60 and the delta configuration 70, thereby simplifying as well as expediting the processing of the baseline configuration 60 and the delta configuration 70 for obtaining the target configuration 75.

The baseline configuration 60 and the delta configuration 70 are represented in Extensible Markup Language (XML) format according to another exemplary embodiment, wherein the respective function blocks 120-123,140-143 are modelled as objects, Therewith, the baseline configuration 60 and the delta configuration 70 are represented as respective XML files $XF_{bc}$, $XF_{dc}$.

The XML representation of a configuration (baseline 60, delta 70, and target configurations 75) is beneficial in encoding the function blocks 120-123,140-143,160-163 (modelled as objects) of the configuration 60,70,75 in a manner that is both human readable and machine readable. Additionally, by using an XML representation for each configuration 60,70,75, the manner in which the function blocks 120-123,140-143,160-163 of the configuration are to be represented, and the manner in which data interdependencies and interconnections between the function blocks 120-123,140-143,160-163 of the configuration 60,70,75 are to be represented, are specifiable in a simplified and a user friendly manner. Furthermore, the XML representation is beneficial in configuring an IED 20 even from a remote location, for example via Ethernet or Internet, because these XML files adhere to the standard protocols of data transfer between remote and interconnected (either wired or wireless or both) devices.

In an XML file, a function block of a configuration is represented with appropriate XML Tags, wherein the XML Tags further comprise appropriate information regarding the function block, such as parametric values. Herein, the respective function blocks 120-123 of the XML file $XF_{bc}$ (representing the baseline configuration) comprise respective XML Tags $XT_{bc}$, wherein the XML Tags $XT_{bc}$ further comprise the default parametric values $VAL_{def}$. Similarly, the respective function blocks 140-143 of XML file $XF_{dc}$, (representing the delta configuration) comprises XML Tags $XT_{dc}$, wherein the XML Tags $XT_{dc}$ further comprise the delta parametric values $VAL_{del}$.

The XML files $XF_{bc}$, $XF_{dc}$, which represent the baseline configuration 60 and the delta configuration 70 respectively, are received by an XML engine 170 of the processor 100. Thereafter, the XML files $XF_{bc}$, $XF_{dc}$ are processed by the XML engine 100 for obtaining an XML file $XF_{tc}$ representing the target configuration 75. The respective function blocks of the XML file $XF_{tc}$ (representing the target configuration) comprise respective XML Tags $XT_{tc}$, wherein the XML Tags $XT_{tc}$ further comprise the target parametric values $VAL_{tar}$ based on the target operation.

Herein, each function block 120-123 of the baseline configuration 60 and a corresponding function block 140-143 of the delta configuration 70 are then processed for obtaining a respective function block 160-163 of the target configuration 75. The processing of the XML files $XF_{bc}$, $XF_{dc}$ involves extracting the parametric values $VAL_{def}$ comprised in the XML tags $XT_{bc}$ of the XML file $XF_{bc}$ and the corresponding parametric values $VAL_{del}$ comprised in the XML tags $XT_{dc}$ of the XML file $XF_{dc}$, and generating the parametric values $VAL_{tar}$ for the function blocks 160-163 for the target configuration 75, thereby obtaining the parametric values $VAL_{tar}$ for the function blocks 160-163. Herein, each of the XML tags $XT_{tc}$ for the XML file $XF_{tc}$ may be obtained by standard XML processing techniques involved for processing XML files.

The processing of the parametric values $VAL_{def}$ and $VAL_{del}$ for obtaining parametric values $VAL_{tar}$ may exemplarily involve one of the following:

1. Merging a function block 120-123 of the baseline configuration 60 with a corresponding function block 140-143 of the delta configuration 70. Hereby, the parametric values $VAL_{def}$ comprised in the XML Tags $XT_{bc}$ may be merged with the parametric values $VAL_{del}$ comprised in the XML Tags $XT_{dc}$, thereby obtaining the XML Tags $XT_{tc}$ comprising target parametric values $VAL_{tar}$ for a respective function block 160-163 of the target configuration 75. For example, the target parametric values $VAL_{tar}$ that are obtained for the XML Tags $XT_{tc}$ can be either a simple concatenation of the respective parametric values $VAL_{def}$, $VAL_{del}$ comprised in the respective XML Tags $XT_{bc}$, $XT_{dc}$, or selective concatenation of certain parametric values $VAL_{del}$, $VAL_{def}$ comprised in the respective XML Tags $XT_{bc}$, $XT_{dc}$.

2. Modifying the parametric values $VAL_{def}$ of the function blocks 120-123 of the baseline configuration 60 responsive to the parametric values $VAL_{del}$ of the corresponding function block 140-143 of the delta configuration 70. Hereby, the parametric values $VAL_{def}$ comprised in the XML Tags $XT_{bc}$ may be added, subtracted, multiplied, or divided, et cetera, with the respective parametric values $VAL_{del}$ comprised in the respective XML Tags $XT_{dc}$, thereby obtaining the respective XML Tags $XT_{tc}$ comprising target parametric values $VAL_{tar}$ for a respective function block 160-163 of the target configuration 75.

3. Replacing the function block 120-123 of the baseline configuration 60 with the corresponding function block 140-143 of the delta configuration 70. Hereby, the parametric values $VAL_{def}$ comprised in the XML Tags $XT_{bc}$ may be simply replaced with the parametric values $VAL_{del}$ comprised in the XML Tags $XT_{dc}$, thereby obtaining the XML Tags $XT_{tc}$ comprising target parametric values $VAL_{tar}$ for a respective function block 160-163 of the target configuration 75.

Apart from the aforementioned, there can be other XML processing operations involved for processing the function block 120-123 of the baseline configuration 60 and the corresponding function block 140-143 of the delta configuration 70 for obtaining the function blocks 160-163 of the target configuration 75, however it is not included herein for the purpose of brevity.

Herewith, each of the function blocks 160-163 of the target configuration 75 is created, thereby creating the XML file $XF_{tc}$ of the target configuration 75. The XML file $XF_{tc}$ comprises the XML tags $XT_{tc}$, wherein the XML tags $XT_{tc}$ further comprise the target parametric values $VAL_{tar}$. By deploying the XML file $XF_{tc}$ of the target configuration 75 on the IED 20, the IED 20 is configured for performing the target operation. If the baseline configuration 60 of the IED 20 is received from the IED, by deploying the XML file $XF_{tc}$ of the target configuration 75 on the IED 20, the baseline configuration 60 of the IED 20 is therewith replaced. Herein, the GUI unit 50 notifies when the baseline configuration 60 is replaced with the target configuration 75, thereby informing a user upon the completion of configuration of the IED 20 in accordance with the target operation.

By using object oriented representation of the function blocks 120-123,140-143,160-163 for the configuration and XML representations $XF_{bc}$, $XF_{dc}$, $XF_{tc}$ of the configurations 60,70,75 the use of standard protocols, such as IEC 61850, is facilitated. Therewith, the configuration of the IED 20 is achieved in a further simplified manner.

FIG. 3 depicts a flowchart of a method for configuring the IED 20 using the system 10 and the different embodiments of the system 10 hereinabove mentioned.

In a step 200, the baseline configuration 60 and the delta configuration 70 are received by the processor 100 for processing the baseline configuration 60 and the delta configuration 70. Since the database 40 and the configurator 30 are communicatively coupled, the processor 100 fetches the baseline configuration 60 and the delta configuration 70 from the database 40. Herein, according to an exemplary aspect, the baseline configuration 60 and/or the delta configuration 70 may be obtained via Ethernet or Internet if the database 40 is remotely located with respect to the processor 100. Furthermore, if the baseline configuration 60 is stored in the IED 20, the baseline configuration 60 may be accessed from the IED 20 itself, and the delta configuration 70 may be accessed from the database 40.

In a subsequent step 210, the baseline configuration 60 and the delta configuration 70 are processed by the processor 100 for obtaining the target configuration 75. Herein, in accordance with the aforementioned, the default parametric values $VAL_{def}$ of the baseline configuration 60 is modified responsive to the delta parametric values $VAL_{del}$ of the delta configuration 70 for obtaining the target parametric values $VAL_{tar}$ of the target configuration 75. According to one embodiment, the XML file $XF_{bc}$ of the baseline configuration 60 and the XML file $XF_{dc}$ of the delta configuration 70 are provided to the XML engine 170 of the processor 100 for obtaining the XML file $XF_{tc}$ of the target configuration 75. Herewith, the function blocks 160-163 of the target configuration 75 comprise the target parametric values $VAL_{tar}$.

In a subsequent step 220, the aforementioned target configuration 75 is deployed on the IED 20. One way of achieving this is by replacing the baseline configuration 60 on the IED 20 with the XML file $XF_{tc}$ of the target configuration 75. Herewith, the IED 20 is configured in accordance with the target operation. In a step 230, the VDU 80 of the GUI unit 50 notifies when the baseline configuration 60 is replaced with the target configuration 75, thereby informing a user upon the completion of configuration of the IED 20 in accordance with the target operation.

Though the invention has been described herein with reference to specific embodiments, this description is not meant to be construed in a limiting sense. Various examples of the disclosed embodiments, as well as alternate embodiments of the invention, will become apparent to persons skilled in the art upon reference to the description of the invention. It is therefore contemplated that such modifications can be made without departing from the embodiments of the present invention as defined.

The invention claimed is:

1. A system for configuring an intelligent electronic device, the system comprising a processor: and
a configurator for obtaining a target configuration for the intelligent electronic device by processing a baseline configuration of the intelligent electronic device and a delta configuration thereof;
wherein the delta configuration is responsive to a target operation of the intelligent electronic device, the target operation being selected from the group consisting of a substation protection operation and a substation control operation;
wherein the target operation of the intelligent electronic device depends on the target configuration;
wherein the baseline configuration is defined by default parametric values of the intelligent electronic device and the delta configuration is defined by delta parametric values;
wherein the delta parametric values are differences between the default parametric values of the intelligent electronic device and respective target parametric values of the target operation;
wherein the baseline configuration and the delta configuration each comprises one or more function blocks, wherein the one or more function blocks of the baseline configuration comprise the default parametric values of the baseline configuration, and wherein the one or more function blocks of the delta configuration comprise the delta parametric values of the delta configuration;
wherein the one or more function blocks of the baseline configuration and the one or more function blocks of the delta configuration are modeled as object oriented objects;
wherein the default parametric values of the baseline configuration and the delta parametric values of the delta configuration are processed for obtaining the target parametric values of the target configuration by performing one or more of:
merging at least one function block of the baseline configuration with at least one function block of the delta configuration,
modifying the default parametric values of the at least one function block of the baseline configuration responsive to the delta parametric values of the at least one function block of the delta configuration,
and replacing the at least one function block of the baseline configuration with the at least one function block of the delta configuration; and wherein said configurator is operably coupled to the intelligent electronic device and configures the intelligent electronic device with the target configuration.

2. The system according to claim 1, wherein the baseline configuration and the delta configuration are implemented in Extensible Markup Language format.

3. The system according to claim 1, wherein said configurator comprises an XML engine for processing an XML file representing the baseline configuration and an XML file representing the delta configuration, and for generating an XML file representing the target configuration.

4. The system according to claim 1, further comprising a configuration storage device for storing at least one of the baseline configuration or the delta configuration, wherein said configuration storage device is operably coupled to said configurator.

5. The system according to claim 1, wherein said configurator is communicatively coupled to the intelligent electronic device.

6. The system according to claim 5, wherein said configurator is adapted to access the baseline configuration from the intelligent electronic device.

7. The system according to claim 6, wherein said configurator is adapted to replace the baseline configuration on the intelligent electronic device with the target configuration.

8. The system according to claim 7, further comprising a notification device for notifying when the baseline configuration of the intelligent electronic device has been replaced with the target configuration.

9. The system according to claim 1, further comprising a Graphical User Interface communicatively coupled to said configurator.

10. A method for configuring an intelligent electronic device, the method comprising:
a step of processing a baseline configuration of the intelligent electronic device and a delta configuration for obtaining a target configuration for the intelligent electronic device;
wherein the delta configuration is responsive to a target operation of the intelligent electronic device, said target operation being selected from the group consisting of a substation protection operation and a substation control operation;
wherein the target operation of the intelligent electronic device depends on the target configuration;

wherein the baseline configuration is defined by default parametric values of the intelligent electronic device and the delta configuration is defined by delta parametric values;

wherein the delta parametric values are differences between the default parametric values of the intelligent electronic device and respective target parametric values of the target operation;

wherein the baseline configuration and the delta configuration each comprises one or more function blocks, wherein the one or more function blocks of the baseline configuration comprise the default parametric values of the baseline configuration, and wherein the one or more function blocks of the delta configuration comprise the delta parametric values of the delta configuration;

wherein the one or more function blocks of the baseline configuration and the one or more function blocks of the delta configuration are modeled as object oriented objects;

wherein the default parametric values of the baseline configuration and the delta parametric values of the delta configuration are processed for obtaining the target parametric values of the target configuration by performing one or more of:

merging at least one function block of the baseline configuration with at least one function block of the delta configuration, modifying the default parametric values of the at least one function block of the baseline configuration responsive to the delta parametric values of the at least one function block of the delta configuration, and replacing the at least one function block of the baseline configuration with the at least one function block of the delta configuration;

and a step of deploying the target configuration thus obtained on the intelligent electronic device.

11. The method according to claim 10, further comprising: a step of receiving the baseline configuration and the delta configuration for processing the baseline configuration and the delta configuration for obtaining the target configuration for the intelligent electronic device.

12. The method according to claim 11, further comprising a step of notifying when the baseline configuration of the intelligent electronic device is replaced with the target configuration.

* * * * *